United States Patent
Wilbrecht et al.

(10) Patent No.: US 10,572,956 B1
(45) Date of Patent: Feb. 25, 2020

(54) METHOD AND APPARATUS FOR MEASURING ENVIRONMENTAL CONDITIONS

(71) Applicant: Cuningham Group Architecture, Inc., Minneapolis, MN (US)

(72) Inventors: Adam Wilbrecht, Minneapolis, MN (US); Philip Andrew Bussey, St Paul, MN (US); Christopher Michael Savage, Seattle, WA (US)

(73) Assignee: Cunningham Group Architecture, Inc., Minneapolis, MN (US)

( * ) Notice: Subject to any disclaimer, the term of this patent is extended or adjusted under 35 U.S.C. 154(b) by 0 days.

(21) Appl. No.: 16/460,034

(22) Filed: Jul. 2, 2019

Related U.S. Application Data

(63) Continuation of application No. 16/388,516, filed on Apr. 18, 2019.

(51) Int. Cl.
*G05B 19/048* (2006.01)
*G06Q 50/12* (2012.01)
(Continued)

(52) U.S. Cl.
CPC ............. *G06Q 50/12* (2013.01); *G05B 15/02* (2013.01); *G05B 19/048* (2013.01);
(Continued)

(58) Field of Classification Search
CPC ...... G06Q 50/12; G05B 19/048; G05B 15/02; G05B 2219/2614; F24F 2110/20;
(Continued)

(56) References Cited

U.S. PATENT DOCUMENTS

2018/0299159 A1* 10/2018 Ajax ................. F24F 11/46

OTHER PUBLICATIONS

Radial Histogram, <https://web.archive.org/web/20180320193524/http:/datavizproject.com/>, retrieved by Archive.org on Mar. 20, 2018. (Year: 2018).*

* cited by examiner

*Primary Examiner* — Alexander Satanovsky
*Assistant Examiner* — Mark I Crohn
(74) *Attorney, Agent, or Firm* — Schwegman Lundberg & Woessner, P.A.

(57) ABSTRACT

According to one example embodiment, method and apparatus are provided to determine the impact of environmental conditions in an indoor space on human wellness, including automatically obtaining a plurality of scientific measurements of respective environmental conditions in an indoor space, and automatically referencing an electronic data repository containing human wellness information specifying a correlation between a magnitude of a scientific measurement of an environmental condition and human wellness, wherein the correlation specifies a range of magnitudes that are favorable to human wellness, and a range of magnitudes that are not favorable to human wellness. Human readable messages and/or symbols to be displayed in connection with a particular magnitude or range of magnitudes of a scientific measurement are also provided in the electronic data repository, wherein the messages and/or symbols concern an impact of an environmental condition on human wellness. Room wellness information is displayed in a graphical display, wherein the graphical display includes numerical information concerning the scientific measurements obtained by the sensors and human readable messages and/or symbols associated with a particular magnitude or range of magnitudes of a scientific measurement as specified in the electronic data repository.

18 Claims, 20 Drawing Sheets

(51) Int. Cl.
*G05B 15/02* (2006.01)
*F24F 110/66* (2018.01)
*F24F 110/70* (2018.01)
*F24F 110/10* (2018.01)
*F24F 120/20* (2018.01)
*F24F 110/20* (2018.01)

(52) U.S. Cl.
CPC ....... *F24F 2110/10* (2018.01); *F24F 2110/20* (2018.01); *F24F 2110/66* (2018.01); *F24F 2110/70* (2018.01); *F24F 2120/20* (2018.01); *G05B 2219/2614* (2013.01)

(58) Field of Classification Search
CPC ............... F24F 2110/66; F24F 2110/70; F24F 2110/10; F24F 2120/20
See application file for complete search history.

| PROMPT MESSAGE | PROMPT CONDITION |
|---|---|
| MESSAGE 1 | CONDITION 1 |
| MESSAGE 2 | CONDITION 2 |
| ... | ... |
| MESSAGE N | CONDITION N |

*FIG. 5D*

Conference Room

1

2

3

Music Classroom

1

2

3

Auto Shop

Hotel Unit

METHOD AND APPARATUS FOR MEASURING ENVIRONMENTAL CONDITIONS

PRIORITY

This is an application is a continuation of U.S. patent application Ser. No. 16/388,516, filed Apr. 18, 2019, which is incorporated by reference here in its entirety.

TECHNICAL FIELD

The present disclosure relates to the field of scientific instrumentation, and more particularly to method and apparatus for measuring, monitoring and interpreting conditions affecting health and wellness of occupants within the built environment.

BACKGROUND

A chief design objective for the built environment is to maintain an optimized indoor environment for occupants. Conventionally, this objective is achieved by controlling temperature and humidity levels, and through air conditioning and fresh air exchange. However, despite efforts to control conditions affecting health and wellness of occupants in the built environment, there remain many variables that are either outside the scope of available control systems, or which are difficult to evenly control in all spaces within the built environment. This frequently results in occupants working or living under sub-optimal conditions. In addition, because occupants are often aware of only the most obvious environmental factors impacting on comfort, health or productivity, they are unable to take full advantage of potential changes they could put into effect to improve the spaces they occupy in the built environment.

SUMMARY

According to one example embodiment, method and apparatus are provided to determine the impact of environmental conditions in an indoor space on human wellness. A plurality of scientific measurements of respective environmental conditions in an indoor space are obtained and used to obtain human readable indicia from an electronic data repository containing human wellness information. The electronic data repository specifies a correlation between a magnitude of a scientific measurement of an environmental condition and human wellness, wherein the correlation specifies a range of magnitudes that are favorable to human wellness, a range of magnitudes that are not favorable to human wellness, and human readable indicia to be displayed in connection with a particular magnitude or range of magnitudes of a scientific measurement. According to one embodiment, the indicia concern an impact of an environmental condition on human wellness. Room wellness information is presented in a graphical display, the graphical display including numerical information concerning the scientific measurements obtained by the sensors, and the human readable indicia associated with a particular magnitude or range of magnitudes of a scientific measurement as specified in the electronic data repository.

BRIEF DESCRIPTION OF THE DRAWINGS

FIGS. 5A-5F illustrate example processes/flow charts for the software and data components generating user interface components such as trend indicia and real time scientific measurements for a room fitness instrument according to an example embodiment.

DETAILED DESCRIPTION

Figure 1:
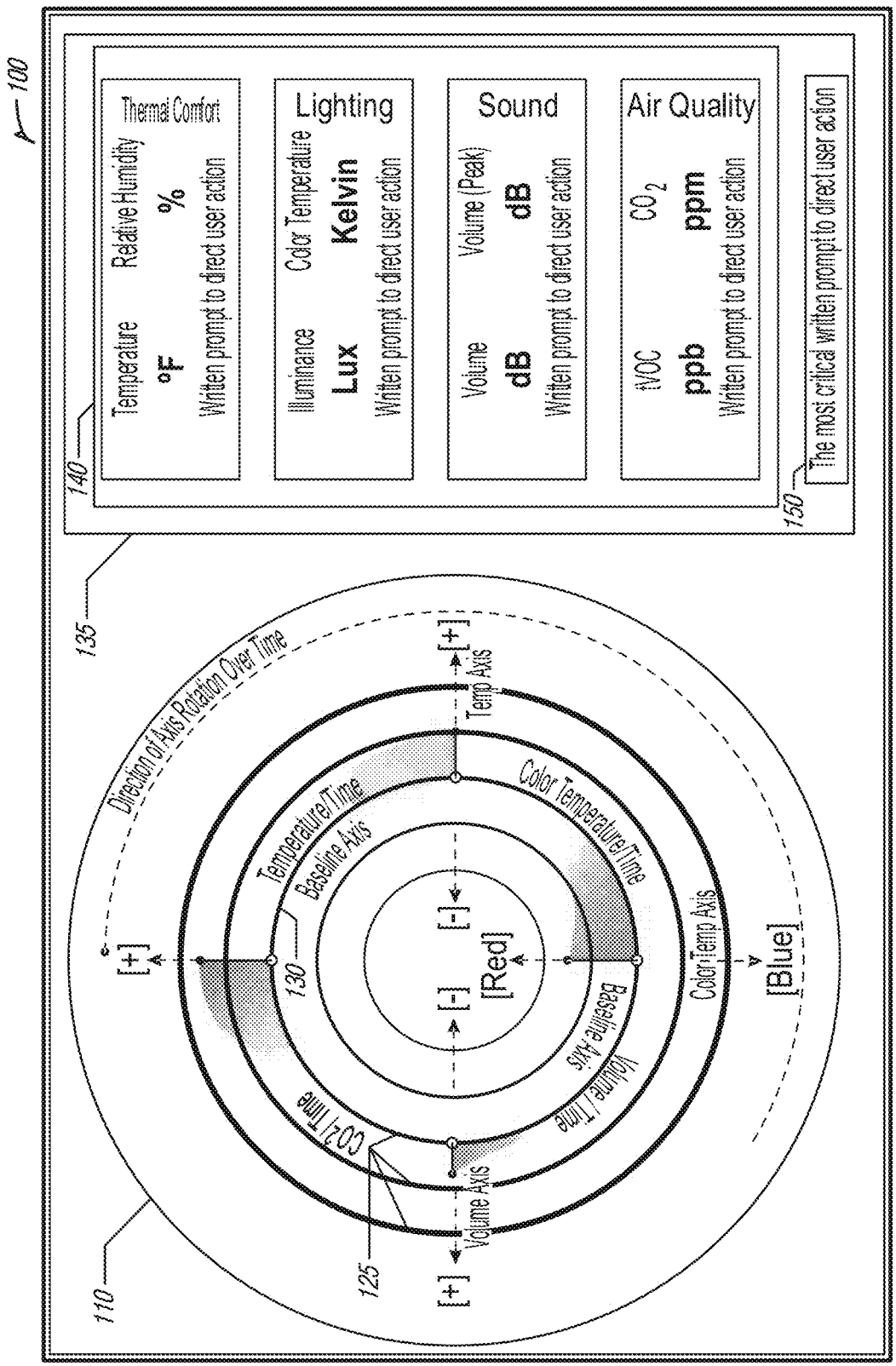
FIG. 1 illustrates a user interface for informing an occupant of the fitness of a space in the built environment for various purposes.

Many factors in the built environment can influence human health, productivity and wellness. However, the typical occupant of the built environment is aware of only the obvious factors, such as temperature, humidity and lighting. Moreover, this lack of awareness means the occupants are unable to take action to address the shortcomings of any particular space, or simply to appreciate the benefits being derived when occupying an optimal space. Or, even if aware of some factors, occupants are unaware of the potential or actual impact the factors may be having on a space's suitability for use. Accordingly, there is described herein an instrument that continuously measures the conditions within a space of the built environment, tracks metrics indicative of the fitness of the space, automatically interprets the actual or potential impact of the conditions on an occupant and presents information in a user-friendly interface. Accordingly, the instrument allows an occupant to better understand an indoor space and take a responsive action, if desired. As will be demonstrated below, this "room fitness" instrument provides a new means of understanding an architectural space using live, real time, and/or historical data.

As described in more detail below, in one example embodiment, the metrics tracked are those which have an impact on human health, productivity and wellness, and target four categories of environmental characteristics: thermal comfort, lighting, sound, and air quality. However, the instrument is not limited to these categories, and fewer or greater or different combinations of categories may be employed. As described below, the fitness instrument measures and collects data on these characteristics and reports them in real time and/or periodically to the occupants of the room. These characteristics are communicated in a user interface that allows the occupants to correlate their qualitative understanding of how they feel about the space's characteristics with scientific measurements of such characteristics. For example, while an occupant will recognize if a room is too loud or dark. The room fitness instrument compliments this thought process and affirms or educates an occupant's perception by providing, in this example, real-time lighting intensity measurements, for example stated in lumens, and actual sound level measurements, in decibels, that exactly quantify, with scientific-based measurements, the loudness of the room. For instance, an occupant may learn that they are most productive within certain ranges of luminosity or noise levels, based on a numerical level of lumens or decibels.

The room fitness instrument also highlights persistent low-grade problems within a space that are less evident, such as the color level of illuminance, the level of CO2, or the level of volatile organic compounds, and again provides users with actionable data for taking ownership of their environment. While normally occupants are unaware of these factors, they may discover, by being able to correlate their state of well-being or productivity with such factors, personal sensitivities to these factors, and take action based on this awareness. For example, an occupant may have a sensitivity to particular colors of lighting, or to elevated CO2 levels. Or, a user may become concerned that they are being subjected to unusual levels of volatile organic compounds. Accordingly, the room fitness instrument described herein focuses on making sensor data accessible and coupling it with information so that room occupants can understand their local environment and take action if desired.

According to one example embodiment, illustrated in FIG. 1, the room fitness instrument presents room sensor data through two modalities in a user interface 100. The first is a numerical and graphical readout showing, for example, temperature, carbon dioxide levels, light intensity and other metric data, in scientific units of measurement. The second modality is interpretive. In this modality, sensor data is calibrated against a knowledge base of practical science and the science of building wellness. This information communicates how each characteristic potentially affects the wellness of the occupants and makes suggestions for how occupants or others may modify the space to make a healthier environment. For example, this information is, in one example embodiment, color-coded based on the effect or expected effect a particular variable or combinations of variables will have on an occupant, most typically a human occupant, but not limited to the effects on human occupants. And, the instrument provides prompts or messages in a human readable language to inform an occupant of the effect the environment is having or may have on the occupant. According to one embodiment, the room fitness instrument provides its measurement outputs to one or more building control systems that can provide adjustments to the room environment through the HVAC, lighting control systems, or other control systems such as automatic window blinds and the like. On the other hand, the room fitness instrument has utility without connection to or integration with such building automation functions. Instead, the occupant is the "control system," and makes rational decisions and takes action based on the information learned from the room fitness instrument.

Thus, according to one example embodiment, the user interface 100 provides an occupant of a space with informative metrics and analytics, including real-time scientific measurements, interpretative information, qualitative impressions, historical data showing the evolution of the space's characteristics over time (histogram), and informational prompts to direct action based on a space's characteristics. As shown in FIG. 1, interface 100 has two primary display areas: a circular display area 110 and a rectangular display area 135. Area 110 includes concentric circles 125 having a common center point and defining magnitude, illustrated as excursions plus or minus from a baseline 130, with rotating histograms around the circles representing data/readings over time, with the time scale of each circle being aligned along a line extending outward from the center point and intersecting each circle. Rectangular area 135 includes a set of metrics 140 describing the state of the space at the current time. As described in more detail below, this information is coupled with one or more prompts 150, that advise or warn an occupant about associated potential health-risks and suggest potential health-positive behaviors. According to one embodiment, variables are color coded for display, for example in blue and red, based on meaning and context. Prompts 150 include a main prompt that is the most critical prompt to direct user action, and individual prompts for each category of measurement.

In the embodiment of FIG. 1, the rotating histograms include CO2/time, temperature/time, color temperature/time, and sound volume/time. Thus, the user interface 100 communicates multiple variables over time and their relation to one another in a manner that is easily understood. In addition, the interface 100 further includes the introduction of prompts 150 to the raw data. These written prompts 150 allow users to understand the impact of sometimes esoteric data and can encourage them to take initiative and action to improve their immediate environment. An additional advantage of the prompts 150 is the ability to display custom information based on business practices or unique characteristics of an environment.

According to one example embodiment, an electronic data repository, stored in an electronic storage device such as one shown and/or described herein, specifies a correlation between a magnitude of a scientific measurement of an environmental condition and human wellness, wherein the correlation specifies a range of magnitudes that are favorable to human wellness, a range of magnitudes that are not favorable to human wellness, and human readable indicia to be displayed in connection with a particular magnitude or range of magnitudes of a scientific measurement. According to one embodiment, the indicia are messages in a human readable language and/or symbols and indicate an impact of an environmental condition on human wellness. Room wellness information presented in the graphical display, in one example embodiment, are color coded or coded according to these ranges, and the human readable indicia displayed according to the magnitude or range of magnitudes of a scientific measurement that are indicated for triggering their display. According to one embodiment, a range may include a range of measurements having an endpoint on both end of the range, or may be a range specified by measurements that are above or below a certain level, with no specific endpoint or limit for magnitude. In one embodiment, the data stored in the repository may be stored in an electronic file, such as a flat file, or may be stored in a database format, such as a relational database format, or in any other format or organization.

According to one embodiment, the sensors used for the room fitness instrument are selected for their ability to target the above-identified four categories of environmental characteristics. These basic metrics have been thoroughly researched, and findings have been incorporated into standards and reference documents. These standards and reference documents establish baselines and ideal levels for each metric.

Air temperature and relative humidity play a large role in occupant comfort. They are also among the most regulated of the properties discussed here, at least in the United States. HVAC systems are typically employed to maintain air temperatures within a relatively narrow range (e.g. 68-75° F.). Such systems are essential to providing comfort in extreme climates like Arizona summers or Minnesota winters. Not all users prefer the same temperature of spaces, and thermal comfort depends on many additional factors such as air movement, seasonality and solar radiation. While temperature is not a true measure of thermal comfort, it has the advantage of being universally understood. One standard, the ANSI/ASHRAE Standard 55—Thermal Conditions affecting health and wellness of occupants for Human Occupancy, suggests that temperature range between 67 and 82° F., taking seasons, humidity, clothing and activity levels into consideration. Relative humidity (RH) is required by the ASHRAE standard to be below 80%, but suggested to be below 65% to reduce microbial growth. While ASHRAE does not proscribe a lower limit for RH, studies have shown that there are associated health risks from environments below 40% RH. See for example, Arundel, Anthony H, et al., 1986, "Indirect Health Effects of Relative Humidity in Indoor Environments", Environmental Health Perspectives 351-361.

Lighting should be adequate for the occupant to comfortably perform appropriate tasks. The color temperature and the level of blue light in particular, affect human physiology: more blue light is associated with higher productivity, but will delay one's ability to sleep via impact on biological signaling mechanisms. Lighting also affects the occupant's mood, well-being and perception of the space. Moreover, the psychological impact as well as the physiological impact of lighting plays a role in wellness. The Illuminance metric is measured in lux and describes the intensity of light in a space. A space with 0 lux is not illuminated. 100-500 lux spaces can support some visual tasks, with high contrast or size. Generally preferred task illumination ranges from 500-2000 lux, and any space with more illuminance is very well lit. Color temperature can have an impact on circadian rhythm. Blue light (higher temperature) can increase productivity during the day, but can negatively impact an occupant's sleep cycle if used later in the evening. One applicable example reference standard for color temperature data and studies is WELL IES, The Lighting Handbook, 10th Edition. See also Abbas, Nadeen, 2006., "Psychological and Physiological Effects of Light and Colour on Space Users", Dissertation, Melbourne: RMIT University.

Sound levels (volume) can affect one's ability to concentrate and, if loud enough, lead to hearing damage. Even when not damaging, sounds can be an irritant and detrimental to wellness. Audio sensors can establish a baseline for the sound intrusion in spaces and baselines established during both the unoccupied night and occupied day can help distinguish between environmental and occupant-driven contributions to the noise level, identifying the best targets for sound mitigation efforts. The maximum volume is the highest point that noise reaches within a given period of time. The max volume is a valuable metric as it represents the worst-case conditions. Ambient Volume is the volume in a space averaged over time. An ambient volume higher than 55 dB will make speech less intelligible. Extended exposure to spaces with a volume of 85 dB or higher poses potential risks for hearing loss. Applicable reference standards regarding sound levels include the WELL OSHA, NIOSH, CDC standards.

Air Quality includes the CO2 and total volatile organic compound (tVOC) levels. Increases in their levels over background levels can indicate poor ventilation and, at sufficiently high levels, these components can have health impacts. Outdoor CO2 concentrations are typically in the range of 300-500 ppm. As the level of CO2 in interior spaces reaches 1000 ppm, there is a measurable but slight reduction in decision making abilities. As CO2 levels hit 2500 ppm, decision making is significantly impaired. There are a range of common indoor volatile organic compounds (tVOC's). These include benzene, formaldehyde, toluene, acetone and many others. The sensors used in this application look at a measure of total tVOC content. This metric is based off a hypothetical standard mixture of tVOC's in the air. Example reference standards for tVOC's include WELL, ANSI/ASHRAE Standards 62.11, OSHA, EPA, and WHO. Other standards and publications include ANSI/ASHRAE Standard 62.1-2013: Ventilation for Acceptable Indoor Air Quality, American National Standards Institute.

Figure 2:
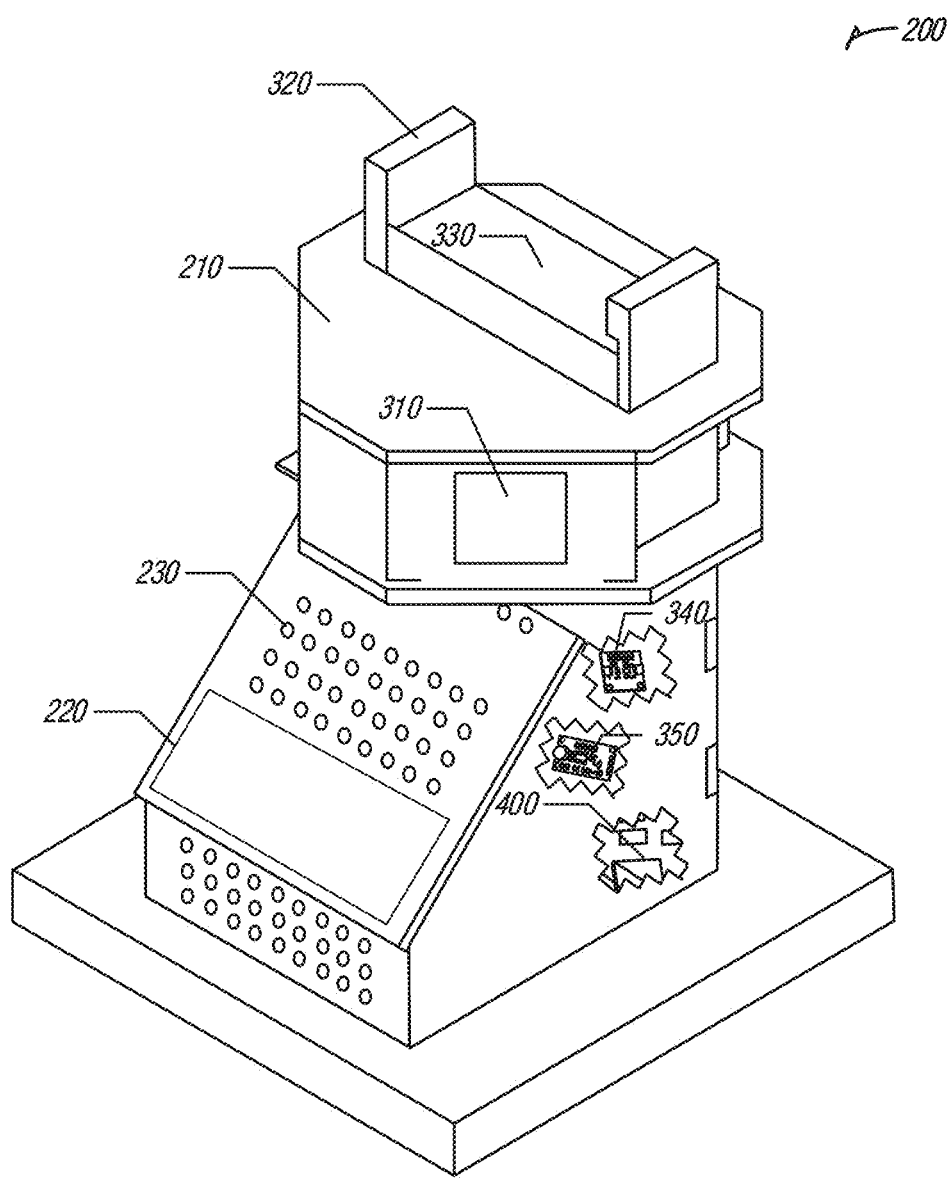
FIG. 2 illustrates a room fitness instrument according to one example embodiment.
Figure 3:
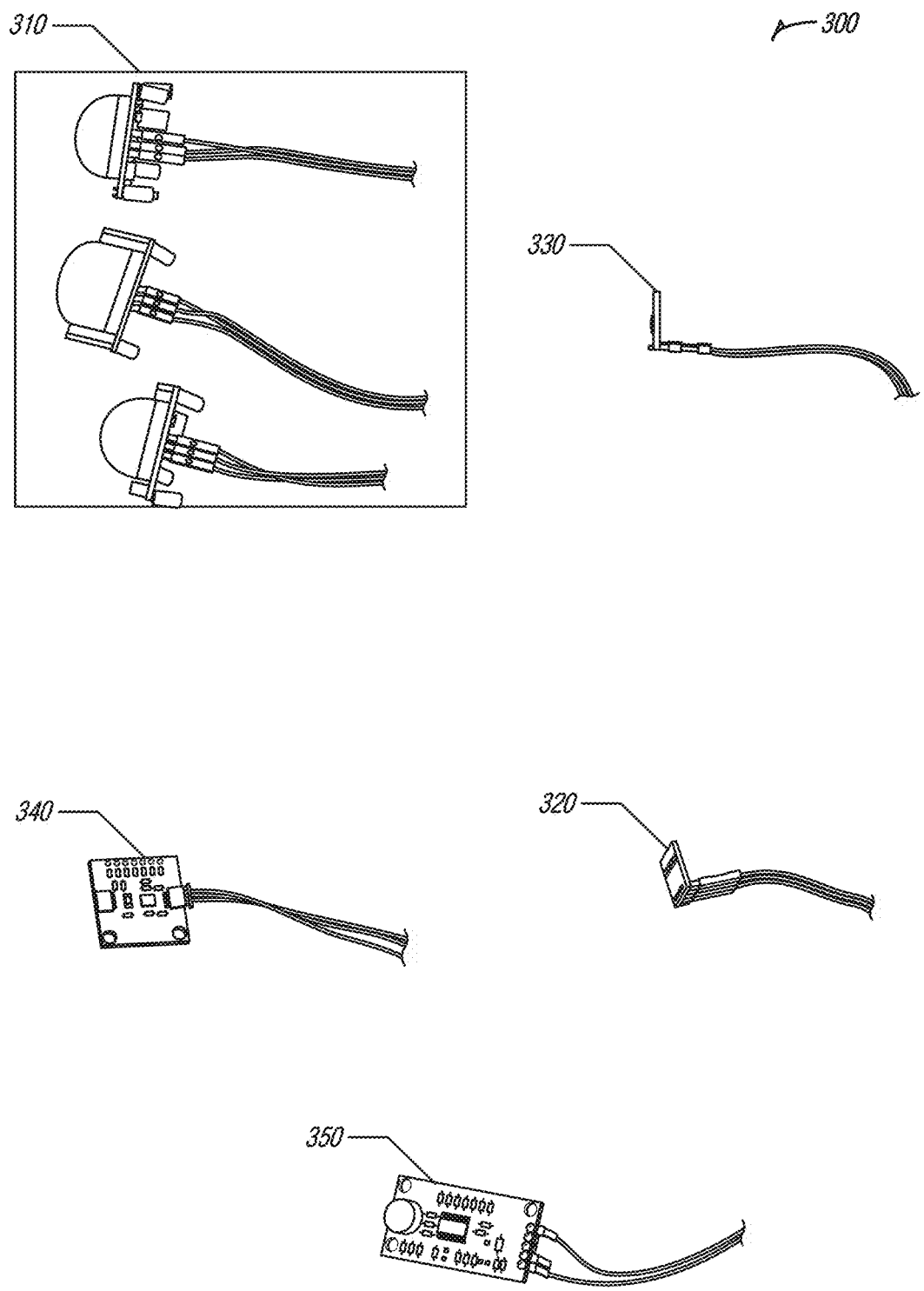
FIG. 3 illustrates sensors used in a room fitness instrument according to one example embodiment.

According to one example embodiment illustrated in FIG. 2, a room fitness instrument 200 includes a housing 210 containing internal compartments and surfaces to mount and support display 220, sensors 300, and processing components 400, illustrated in more detail below. Ventilation apertures 230 on the housing provide ventilation for the electronic components and allow for sound and air to reach the appropriate sensors. As illustrated in FIGS. 2 and 3, three motion sensors 310 are arrayed around the housing 210 to provide 360° of coverage, allowing room occupancy to be determined regardless of location, and enabling the instrument to be placed against a wall or in the center of a room, such as on a conference table. Passive infrared motion sensors (e.g. an HC-SR501) are used to determine occupancy. These sensors can detect the change in infrared radiation due to a warm human body passing through a cooler room. This type of sensor is inexpensive, simple to operate and can cover a large area.

According to another example embodiment, the fitness instrument may take the form of a compact, wall-mounted unit, having a form factor similar to a conventional wall mounted thermostat. In another example embodiment, described in greater detail below, the instrument is incorporated into a smart phone, such as an Apple iPhone® smart phone, or an Android® smart phone, and the sensors are also incorporated into the smart phone, or the sensors are deployed in a separate housing that is connected to the smart phone with a wireless connection, such as a BlueTooth® connection or WiFi connection. In this embodiment, the display of the smart phone is used to display the user-interface 100.

Wide-angle light sensors 320 and 330 are supported by the housing, for example on the top and sides, to measure the ambient light arriving from the sides and above, to assist in avoiding the light sensor being biased by adjacent materials. More specifically, light color readings can be significantly affected by the color of adjacent materials, such as ceiling materials, so compensation for this bias is included. According to one example embodiment, two sensors 320 measure light: a calibrated sensor (e.g. a SparkFun APDS-9301) that provides the ambient light level in lux and a color sensor 330 (e.g. a SparkFun ISL29125) that measures red, green, and blue (RGB) components of the light spectrum. Though the three individual color component measurements are maintained through an analysis chain and logged, a single correlated color temperature—calculated from the RGB values—is typically used as a simpler means to characterize the color spectrum. White light has a color temperature of around 6000 K (the temperature of the Sun); the color becomes redder at lower temperatures and bluer at higher temperatures.

Air quality readings are taken using an air quality and thermal sensor 340 that measures VOCs, CO2, and/or CO, air temperature, humidity and atmospheric pressure.

According to one example embodiment, these measurement capabilities are provided by a SparkFun Environmental Combo board.

The sound sensor 350, for example, a SparkFun Sound Detector, is placed within the housing, optionally in a mounting to isolate it from mechanical vibration of the housing and provides omni-directional sensitivity to the ambient sound level. The apertures in the housing allow for sound transmission into the device.

Figure 4A:
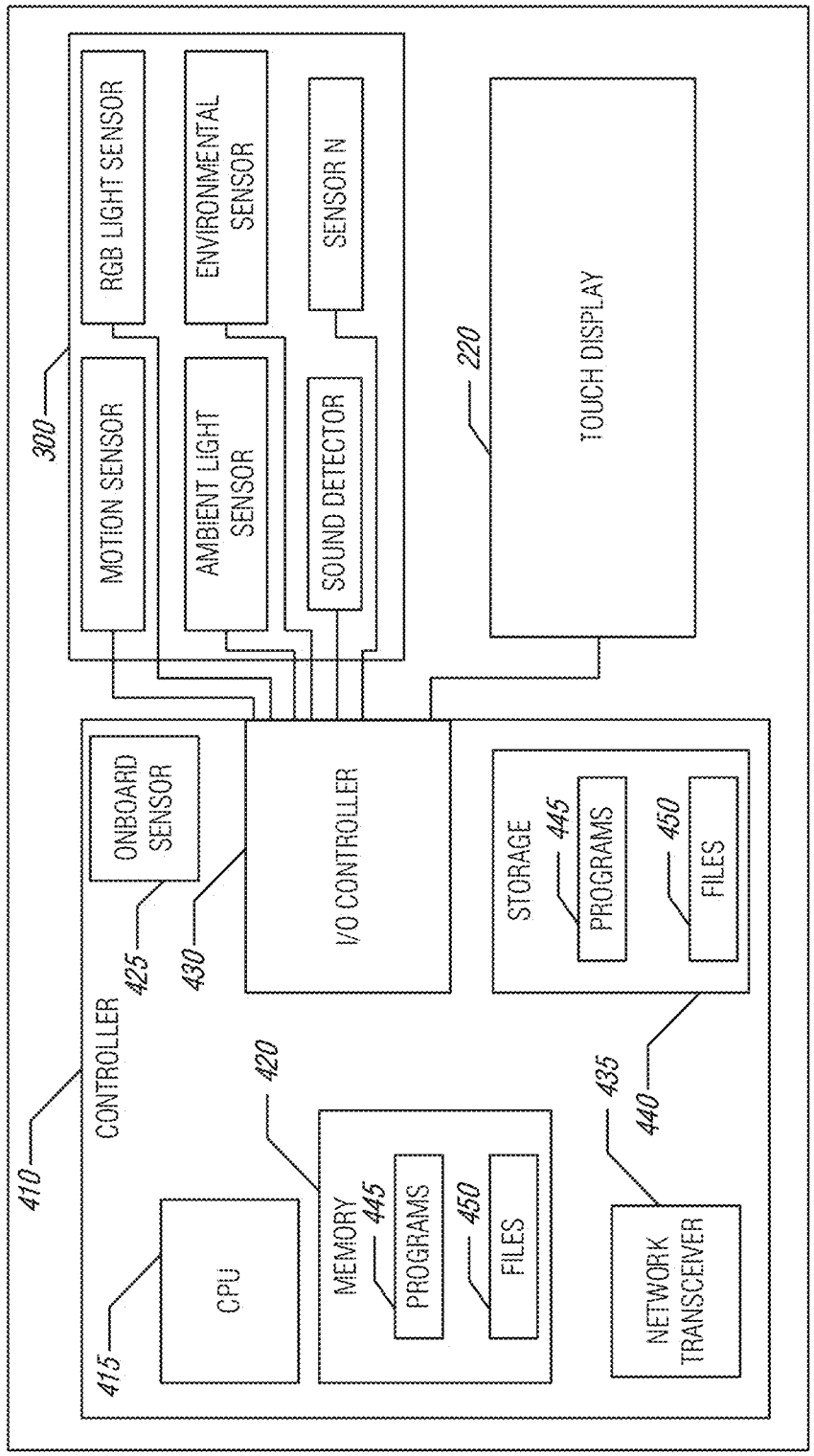
FIG. 4A illustrates a simplified diagram of the electronic components of a room fitness instrument according to an example embodiment.

Referring now to FIG. 4A, there is illustrated a simplified diagram of the processing components 400. According to one example embodiment, the components 400 include semiconductor components, including one or more microcontroller(s) 410, processors, 415, memory devices 420, I/O components 430, network interface components 435, storage devices 440. One or more computer programs 445 and data files 450 are stored in the memory devices 420, the storage devices 440 and processor(s) 415. According to one example embodiment, the one or more microcontroller 410 collects, stores and processes data obtained from the array of sensors 300, controls the display of information on the display 220, as illustrated above and below, and provides input-output (I/O) of data to external networks and servers, for example over a wireless or wired network connection. According to another embodiment, memory devices 420 and data files 450 form an electronic data repository organized to allow the data in the data files to be accessed and/or written to, as described herein. In one embodiment, the electronic data repository may have a flat file structure, or may be organized as a relational database, or organized in another other fashion suitable to allow data to be accessed/retrieved with a read operation, added to or modified with a write operation.

Figure 4B:
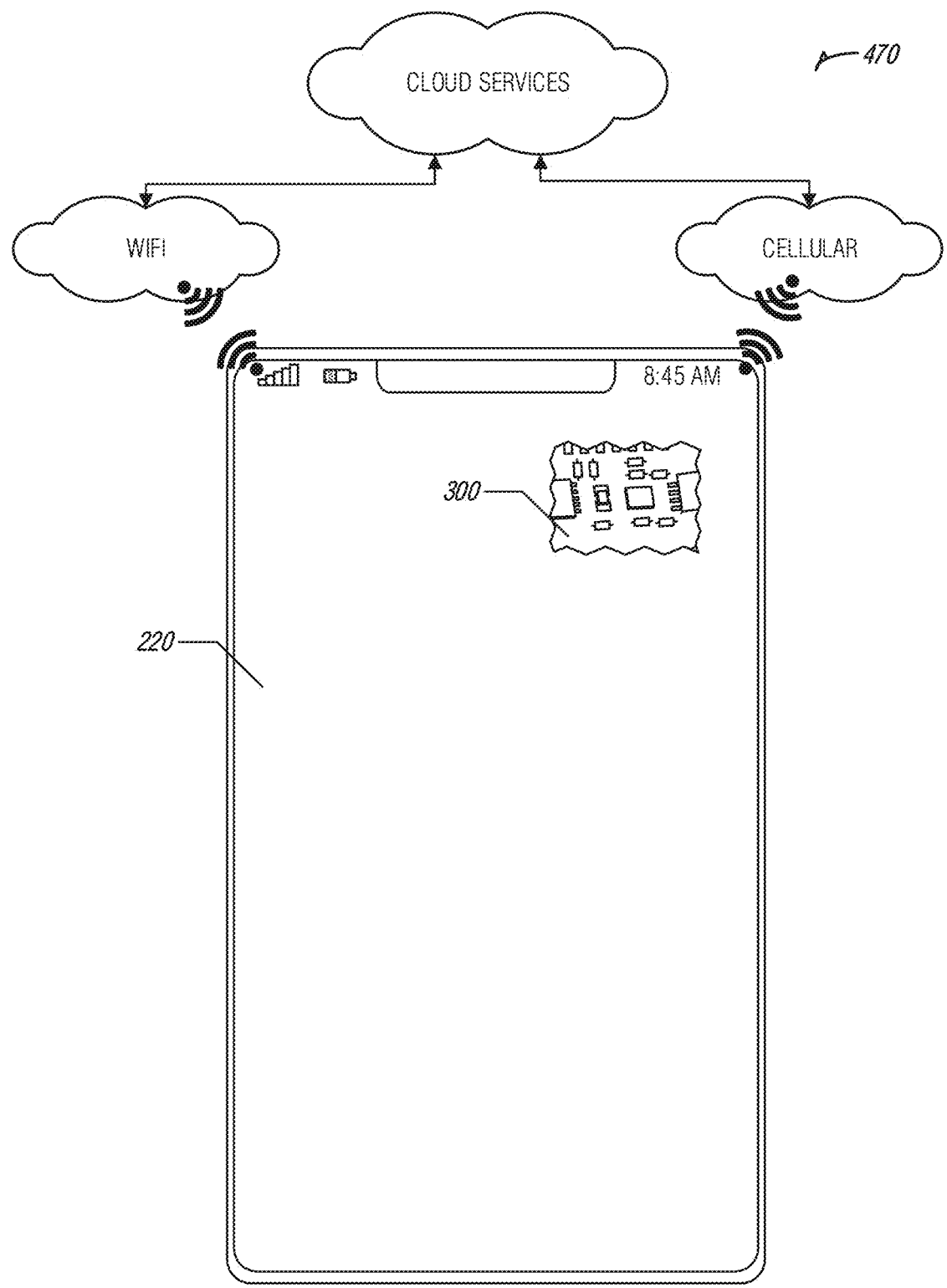
FIG. 4B illustrates an alternate embodiment of a room fitness instrument wherein the room fitness instrument is integrated into a smart phone or other mobile device.

Referring to FIG. 4B, a simplified diagram of an integration of the room fitness monitor in a mobile phone, such as a smart phone, is provided. According to this embodiment, one or more of the above-discussed sensors are mounted or contained in the smart phone housing, and obtain measurements as described elsewhere herein. In this embodiment, the electronic components required to process the incoming sensor data and provide the other functions described herein with respect to FIG. 4A or elsewhere, are provided by the smart phone, such as one of the smart phones referred to above, and the graphical display of data such as such in FIG. 1 is performed on the display of the mobile phone. In one example embodiment, the smart phone stores all required programs and data in its on-device data storage components such as RAM memory and all processing required is done on the smart phone in its processing systems such as described below with respect to FIG. 8. In another embodiment, some or all of the processing required to produce the desired display outputs as for example are illustrated in FIG. 1 and FIGS. 6A-6D, is performed on a remote server, for example connected to the smart phone through a wireless network and a wide area network. The wireless network may be a wireless network provided by a wireless access point in a building or area, or may be a cellular network adapted to accommodate mobile devices, or any other network. In other embodiments, such as that shown in FIG. 2, storage and processing of programs and data may also be done entirely on the local device such as instrument 200, or be done in whole or in part on a remote server such as illustrated in FIG. 4B.

Figure 5A:
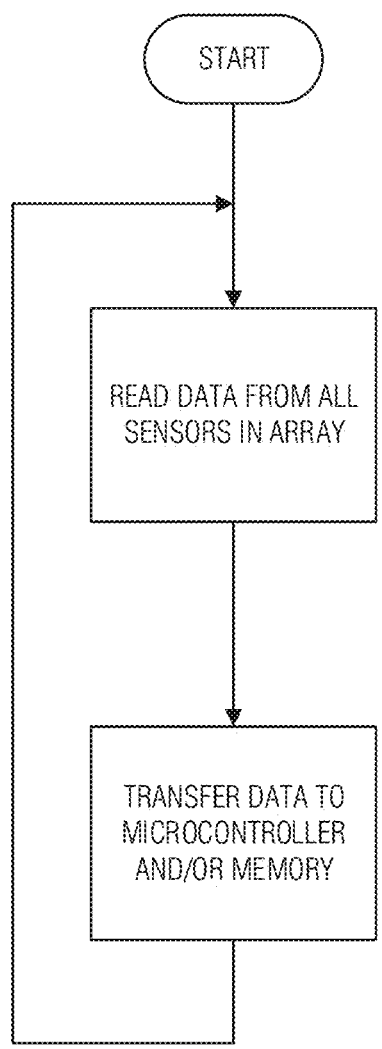

Referring now to FIGS. 5A-5F, there are illustrated processes running on microcontroller 410, controlled by associated computer programs, used to process data obtained from the sensor array 300, generate the user interface 100, and perform other tasks, as described below. As illustrated in FIG. 5A, a data collection process 510 running on microcontroller(s) 410 continuously captures the readings that are produced in the form of digital signals by the individual sensors of array 300. Process 510 transfers the data from the sensors to onboard microcontroller memory or to the external memory devices 420, for short or long-term storage. Memory devices 420, in one example embodiment, store the electronic data repository described herein for translating scientific measurements into human readable indicia, for example human readable messages in a human language, and/or coding for control of the user-interface 100.

Figure 5B:
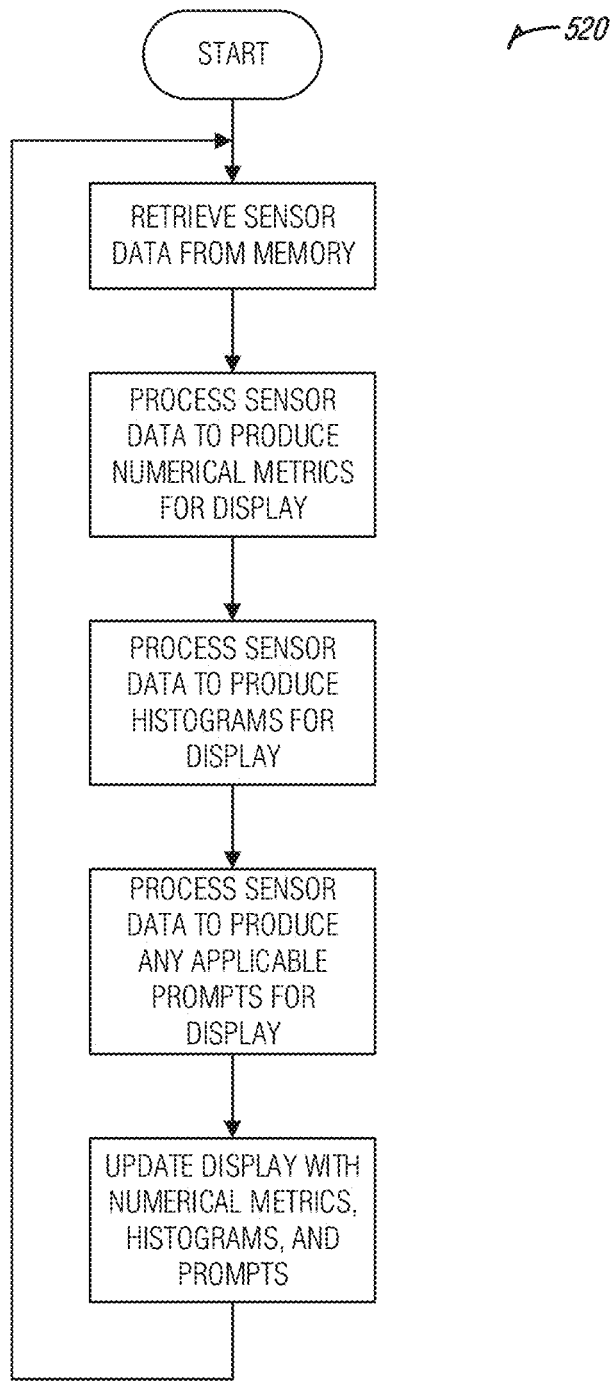

As illustrated in FIG. 5B, a display driver process 520 retrieves and processes the sensor data, and controls display 220. According to one example, process 520 continuously receives the sensor data and continuously generates updated display control signals to cause the display of corresponding numerical readings, histograms and prompts.

Figure 5C:
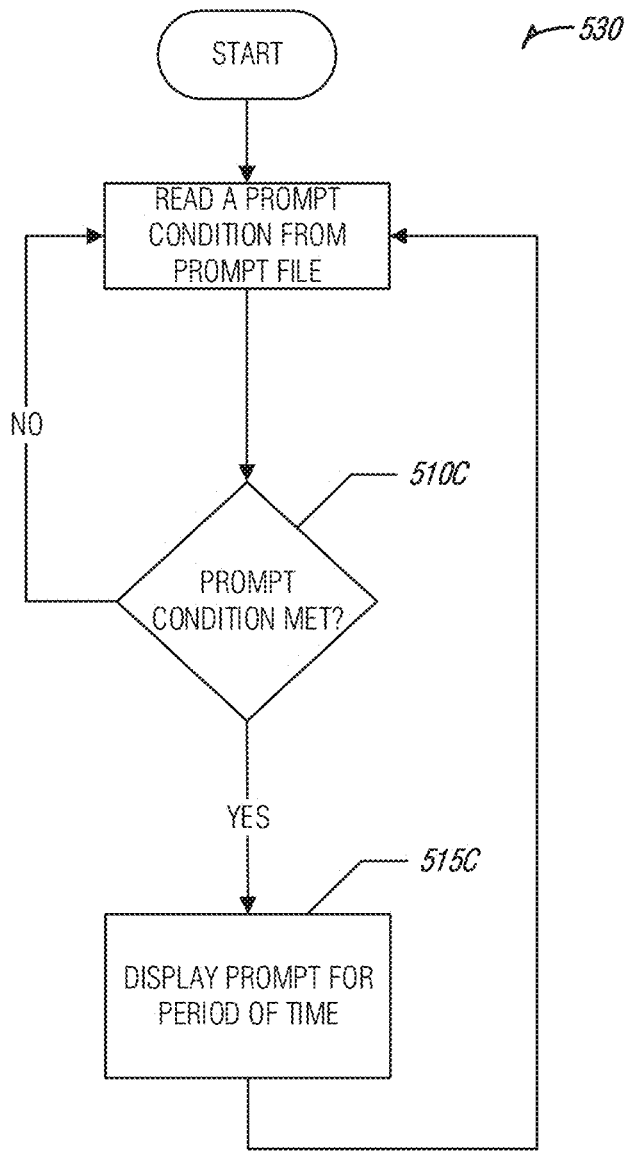

As illustrated in the process 530 of FIG. 5C and prompt file of FIG. 5D, the display of human readable indicia such as messages or prompts is determined by determining if the condition for display of a prompt is met, and if so, displaying the prompt during the time the condition is met, and optionally for a designated period of time after the condition is no longer present. As shown FIG. 5D, one or more prompts are stored in a prompt file, for example in XML format, which in one example embodiment is stored in memory 420, or in on-board memory in the microcontroller 410. Each prompt in the file consists of a message in a desired human language, such as English, and for each prompt, the prompt file further includes a definition of which prompt display area to use to display the prompt should it be triggered for display. The conditions to trigger the display of a prompt are also provided in the prompt file, and specify the conditions affecting health, wellness or other condition of occupants, as determined by the sensor array, upon which a prompt will trigger for display. Such conditions may be defined by a single sensor reading, a combination of sensor readings, a duration of a sensor reading, or any combination of the foregoing, or other criteria, that, when met, trigger the display of a particular prompt.

Figure 5E:
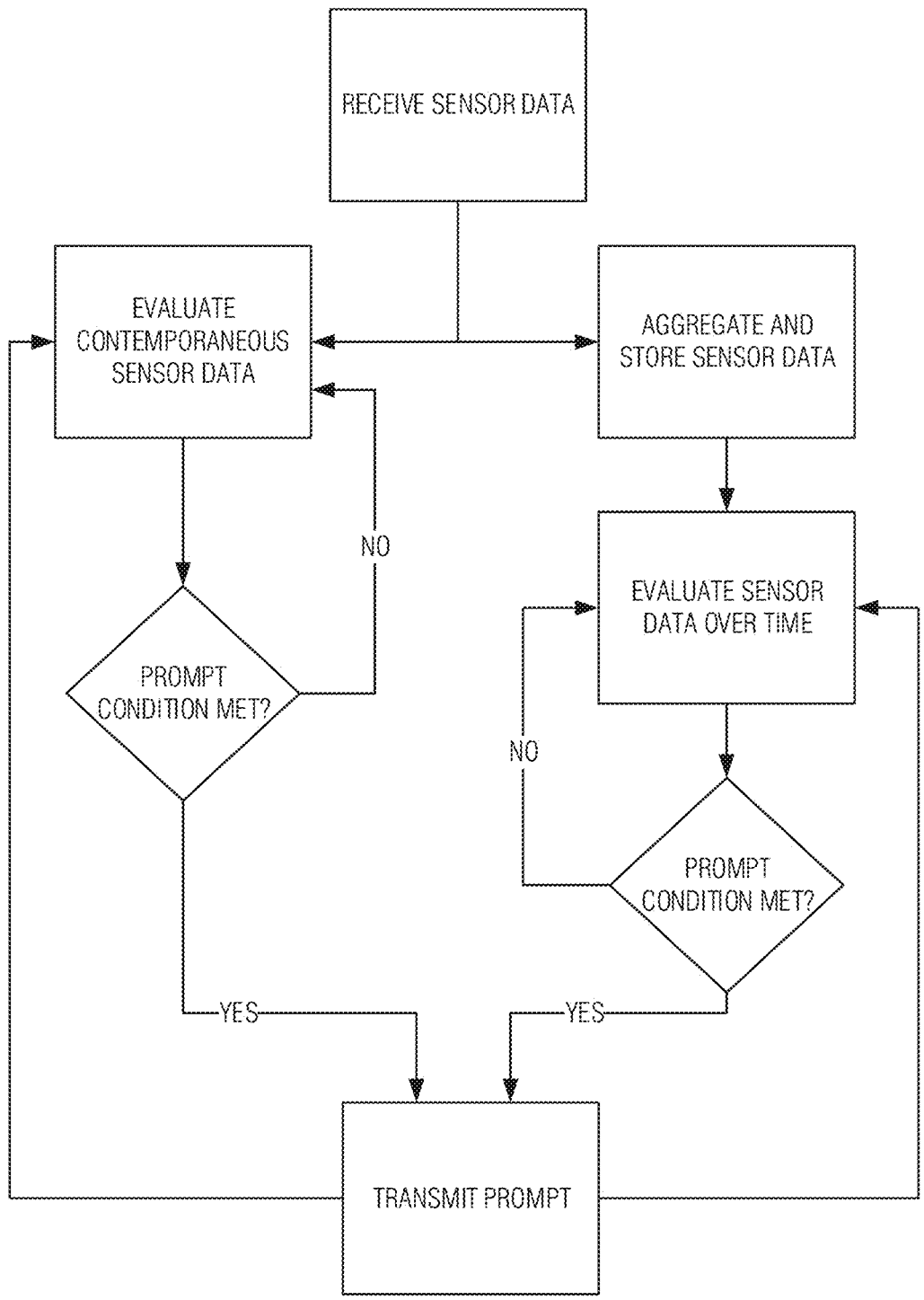

As further illustrated in process 540 of FIG. 5E, in one embodiment, human readable indicia or symbols, or prompt, such as describe below is sent based on a trend of measurements over time as opposed to instantaneous measurements or transient conditions, so that a plurality of measurements over time are taken and analyzed to determine if conditions are met to display a particular prompt. Such analysis may take the form of determining if a measurement is increasing at a rate over time that exceeds a desired rate increase threshold. Or, such analysis may take the form of determining if a combination of measurements taken over time should generate an alert, such as an increase in $CO_2$ combined with an increase in temperature. Thus, the process and software of the instrument illustrated herein is capable of controlling the display of prompts based on a simple level of one measurement, the level of one measurement as it changes over time, or a combination of any of these or even on still other conditions or criterion.

According to one example embodiment, examples of indicia and/or messages, and the conditions upon which to display, include the following:

1. The sound intensity level of this space has exceeded 100 dbA for over two (2) hours which may adversely affect hearing (note: this is an OSHA standard).

2. The sound intensity level of this space has exceeded 90 dbA for over eight (8) hours which may adversely affect hearing (note: this is an OSHA standard).
3. This space is experiencing elevated levels of VOCs. Please consider taking action to protect yourself, such as leaving the space or allowing in fresh air.
4. This space is experiencing elevated levels of Carbon Dioxide. At this level you may experience headaches, poor concentration, or nausea.
5. Blue light levels exceed recommended exposure levels prior to sleep. Please consider changing light source exposure at least 30 to 60 minutes prior to planned bedtime. (this warning would be triggered after known time of sunset).
6. The light intensity in this space is suitable for reading books and most activities requiring visual focus.
7. The light intensity in this space is low and not suitable for reading without potential eye strain.
8. This space is experiencing high humidity levels which may cause discomfort.
9. This is space is experiencing excessively high humidity which may promote mold propagation.

According to one example embodiment, the human readable indicia specified in the data repository or in a prompt file includes indicia to indicate what actions a human can take to abate or alleviate an environmental condition, such as "open a window", "move to another room", "draw the blinds", "turn light on", or "turn up thermostat", thus providing guidance to a human occupant of a room as to how they could improve their environmental situation.

Figure 5F:
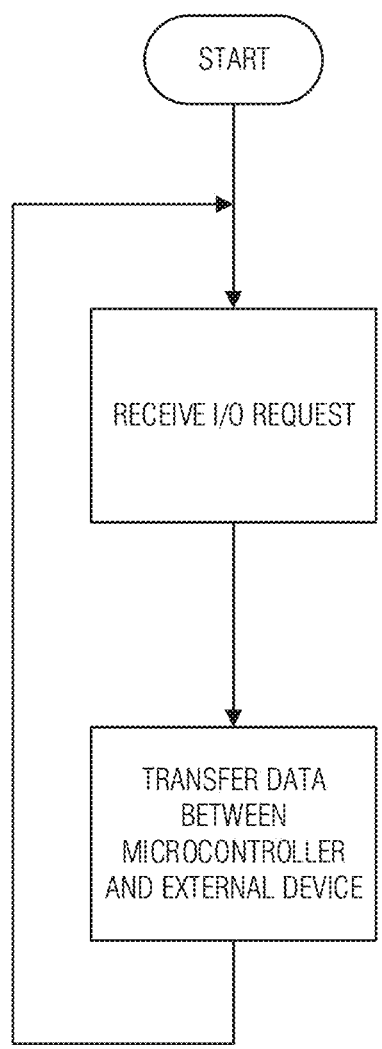

Also provided is a process 550, illustrated in FIG. 5F, and operative to enable the microcontroller(s) 410 to communicate with and exchange data and or control signals with another computing system or device, for example over a local area network, wide area network, and/or wireless network. In one embodiment, the external computing device is a server in the same building as the instrument, or is a server located off-site such as at a remote computing facility.

Figure 6A:
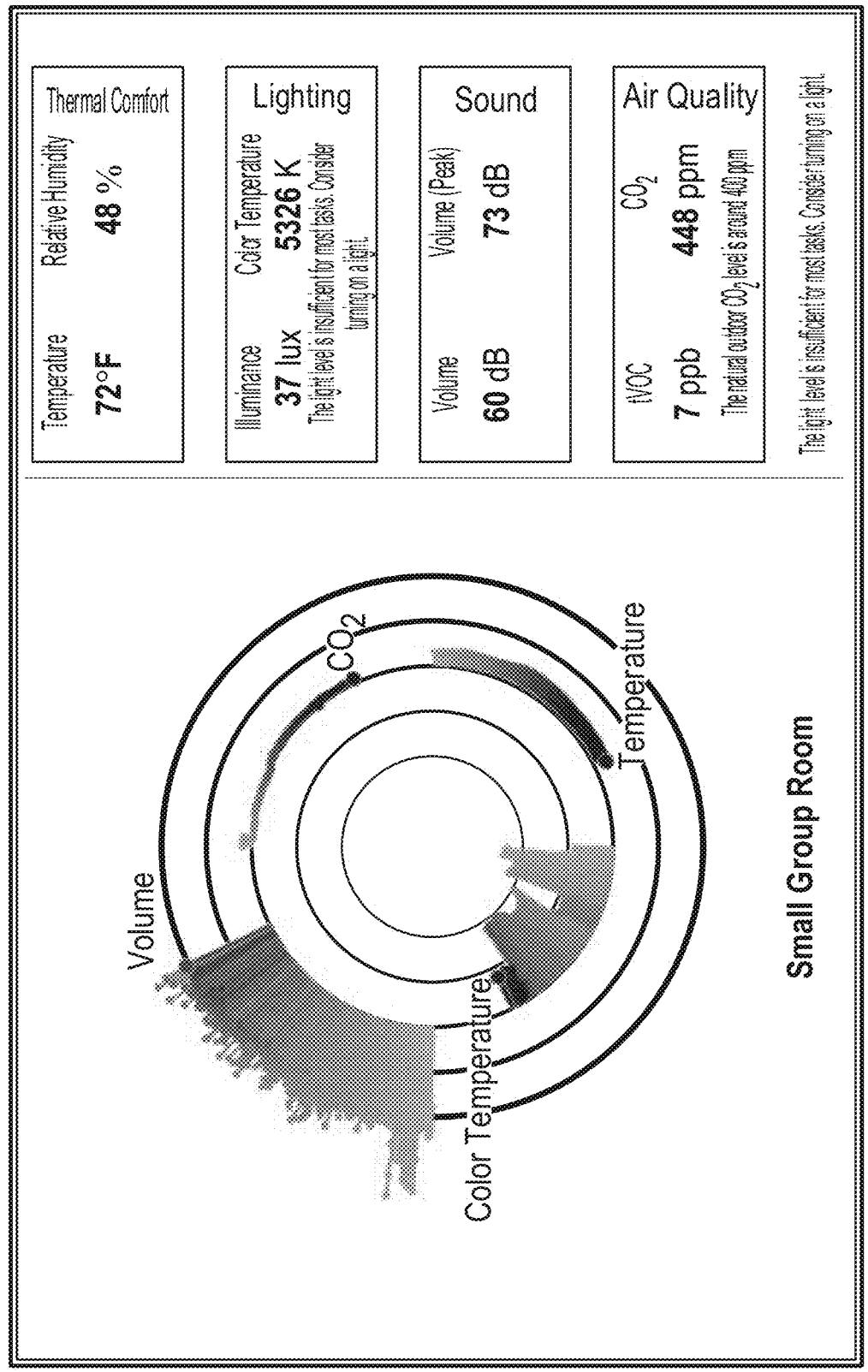
FIGS. 6A-6D illustrate example user interface displays according to example applications of a room fitness instrument in different spaces.

Turning now to FIGS. 6A-6D, there are illustrated example images taken directly from the instrument displays as they collect data. These screenshots demonstrate how a space's data tells a story complimentary to its immediately observable characteristics. Referring to FIG. 6A, the example histogram was generated over a four-hour period in a small group room frequently used for short, one-on-one meetings and phone calls. The room is located near an open office space and the door is typically left open when the space is not in use. A key indicator of this space's activity is the color temperature. The space uses motion activated lights. The abrupt swings represent switching from dim ambient light composed of natural and artificial light, to being lit primarily by artificial light. The lights in this space have been tuned to have a warm color temperature. When comparing the temperature metrics to the color temperature, it appears that occupants opening and closing the door to the small group room caused subtle shifts in the temperature, as the HVAC system accommodated to different air flow conditions. Overall, the volume was fairly consistent from unoccupied to the second occupancy, but the first occupancy caused a dramatic spike. This likely indicates that the first occupants spoke loudly, while the second group were no louder than the ambient sounds of the office outside the group room.

Figure 6B:
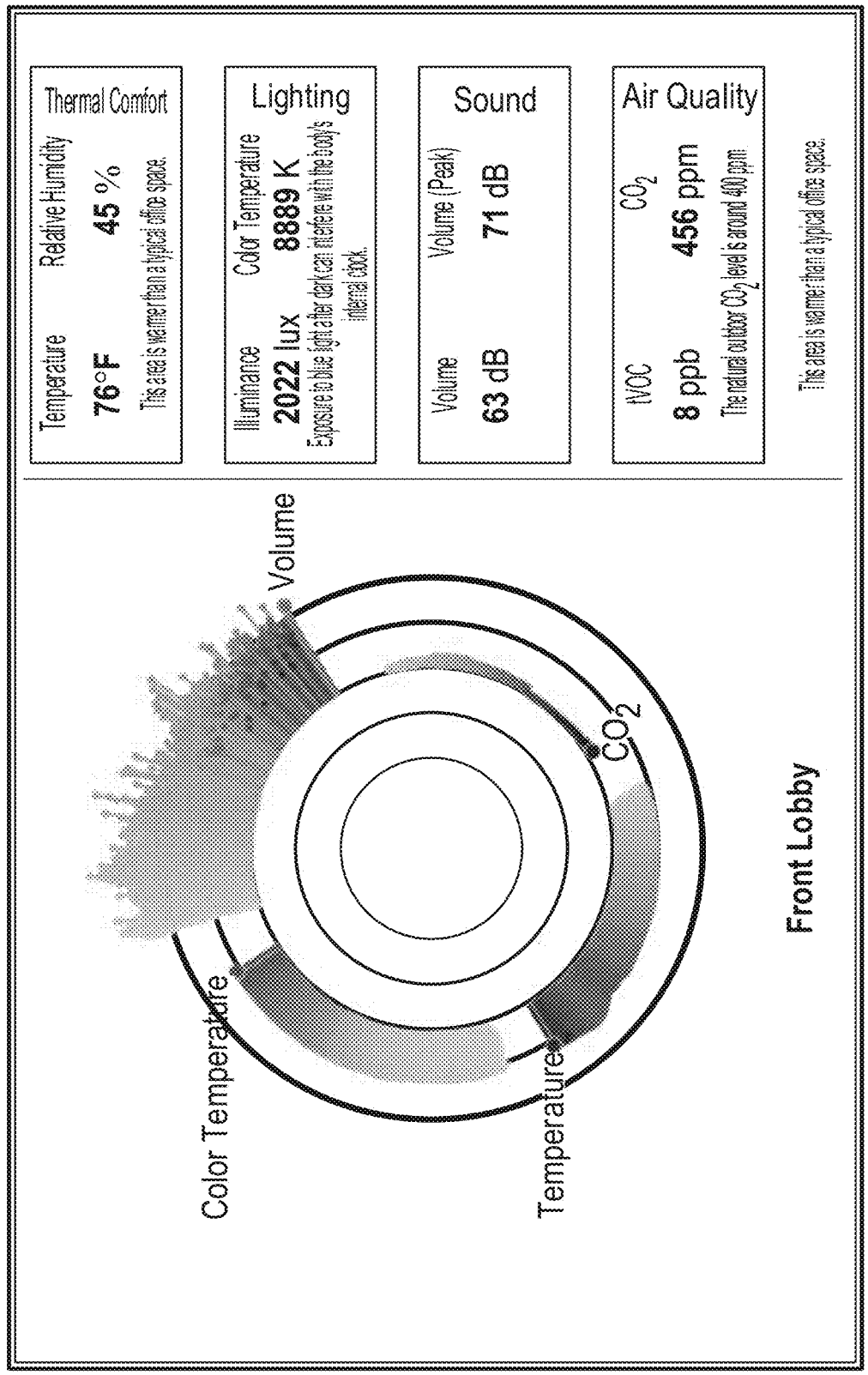

The example histogram of FIG. 6B was generated over a four-hour period in the front lobby of an office. The data collection took place in the early to late afternoon, toward the end of the week. The most noteworthy metric the sensors recorded was the frequent spikes in volume as people walked through the space while having conversations. The sound regularly spiked from acceptable ambient sound levels to extremely high volumes. The sound was heightened by end-of-the-week excitement resulting in increased conversations and enthusiasm. Another noteworthy relationship between the space's metrics is the spike in temperature and the reduction in CO2. The temperature spiked because of the space's west facing glazing and an increase in direct radiation. This spike caused the HVAC to compensate and work to bring the temperature back to the target value. This increase in ventilation and cooling also increased fresh air concentration, reducing the amount of CO2 in the environment.

Figure 6C:
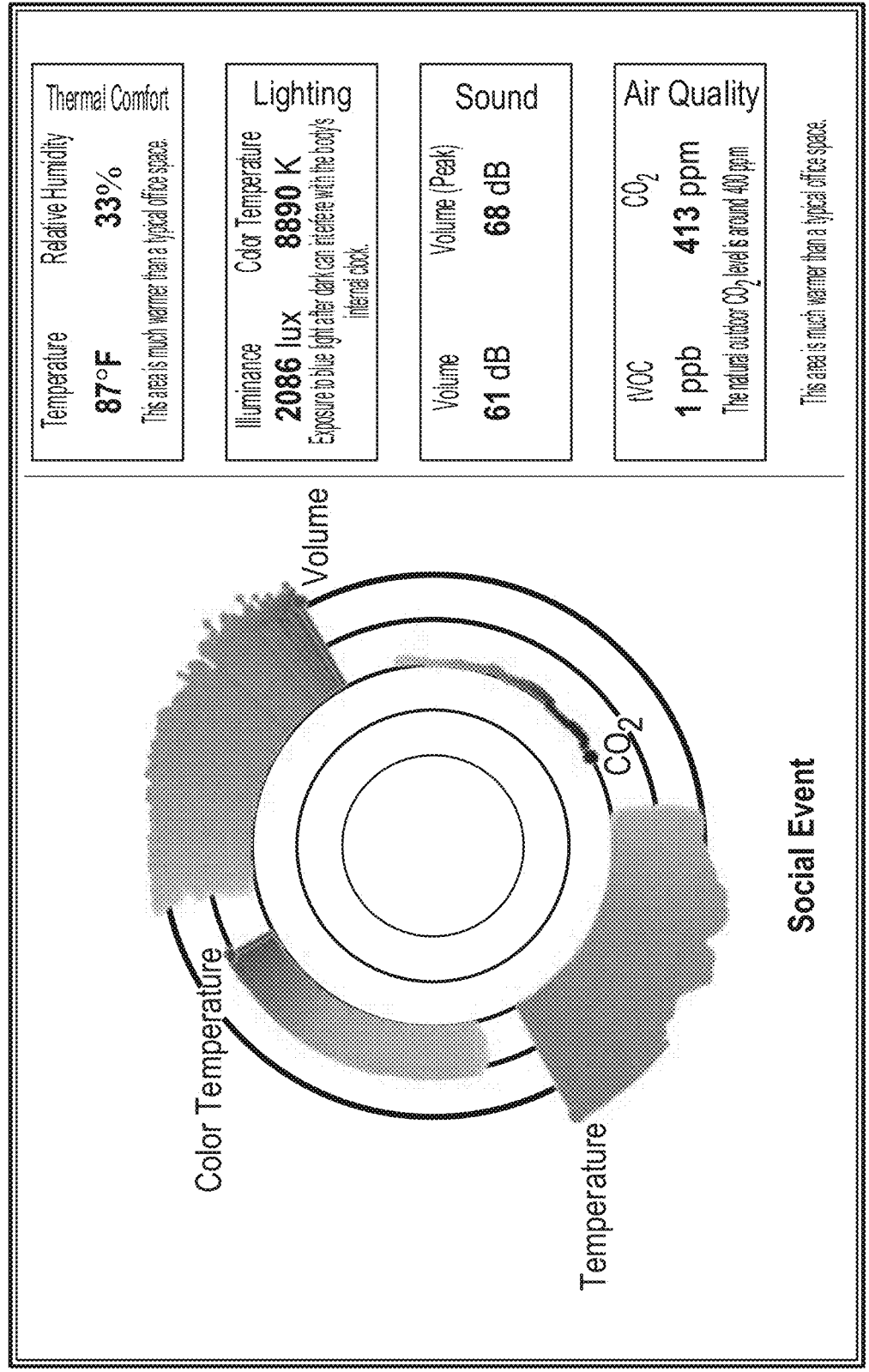

The example histogram of FIG. 6C was generated over a four-hour period in a kitchen dining area of an office. This happened to be during the preparation for and duration of a company social event. This social event took place during the evening and the dining area has west-facing glazing. During the initial preparation for the event, volume levels were on the high end of typical office space, but during the event itself they spiked well above this, before returning down to slightly above normal. The color temperature the sensor picked up stayed consistent, as the sun had not begun to set at this point. However, due to the sun's positional changes, the space took on a large amount of additional heat. This trend was exacerbated by the large quantity of people in the area immediately surrounding the sensor. While the people in the space were giving off additional amounts of CO2, the very active state of the HVAC compensating for the temperature influx kept the CO2 at a healthy level.

Figure 6D:
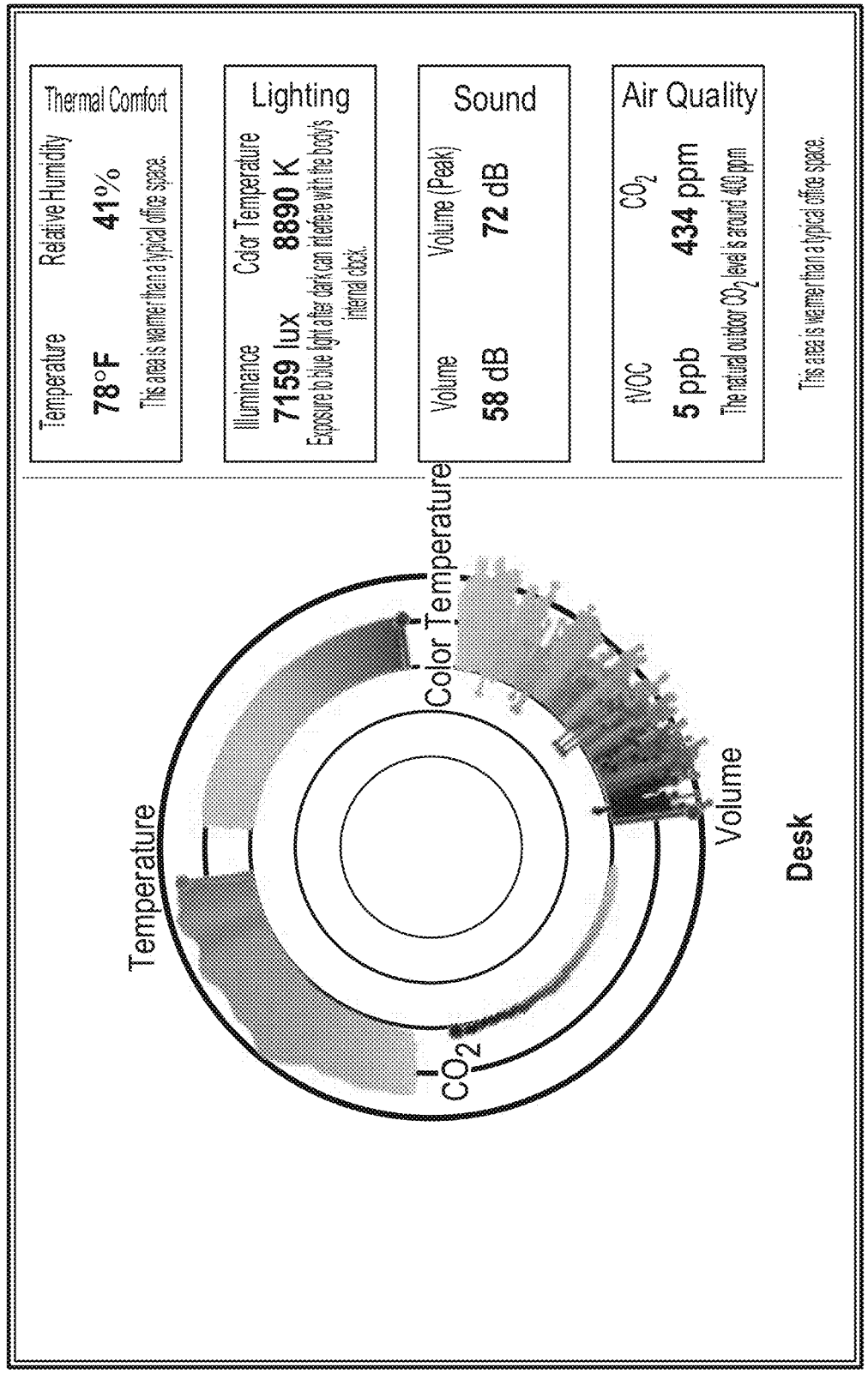

The example histogram of FIG. 6D was generated over a four-hour period located at an office desk. This data collection took place during the middle of the afternoon at a desk directly adjacent to a south-facing window. The desk and the sensor were receiving direct solar radiation. This is reflected in the temperature at the desk. The fluctuations in the temperature were likely driven by two factors: the partially cloudy day and the nearby HVAC ducts cooling the space. The space was primarily naturally lit, resulting in a relatively blue color temperature. The volume would spike regularly as the office worker and those in the surrounding desks would engage in conversation.

Figure 7A:
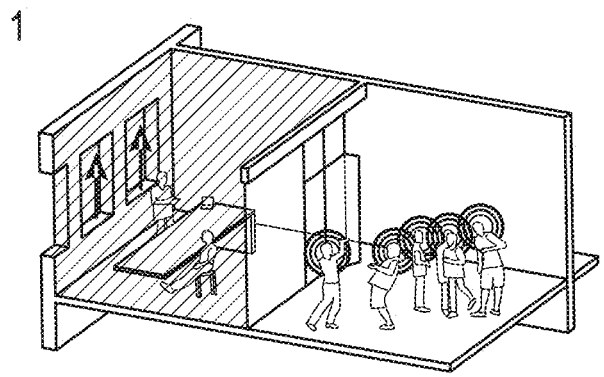
FIGS. 7A-7D illustrate additional example applications of a room fitness instrument according to an example embodiment.
Figure 7A:
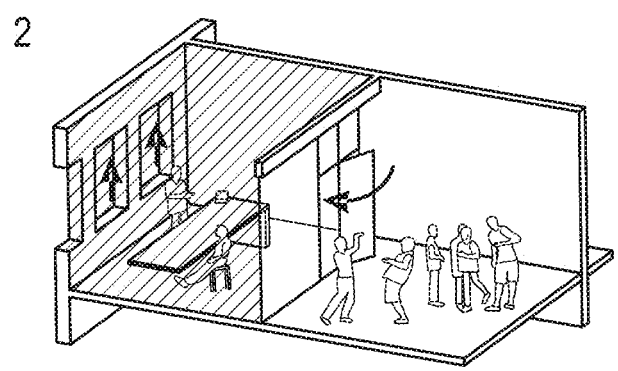
Figure 7A:
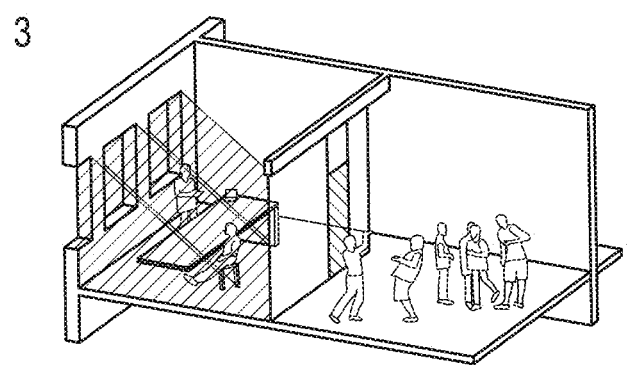

FIGS. 7A-7D illustrate a series of four hypothetical applications of the instrument. Each scenario is described graphically and through a brief narrative. These scenarios illustrate the wide range of future applications possible for this device and the impact it can have on every day occupants. FIG. 7A illustrates a conference room application. Two office workers are meeting to discuss the current state of a project. Outside the small meeting room where they are sitting, a social event is taking place, creating quite a bit of noise. One of the two office workers notes to the other the noise is bothering them. When going to close the door, the office worker checks the instrument to see the impact their decision has made. When doing so, they notice a message saying the room is below recommended light levels for performance of visual tasks with small size. In addition to closing the door, the office worker decides to open the blinds. In this scenario, closing the door was driven by perceived discomfort. The office worker is accustomed to the instrument's presence, and the decision to check their impact on the environment led them to make an additional decision. In this way, the instrument can lead to supplemental adjustments when making decisions to adjust one's environment.

Figure 7B:
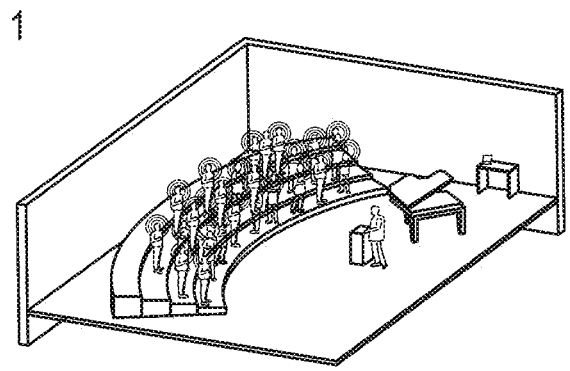
Figure 7B:
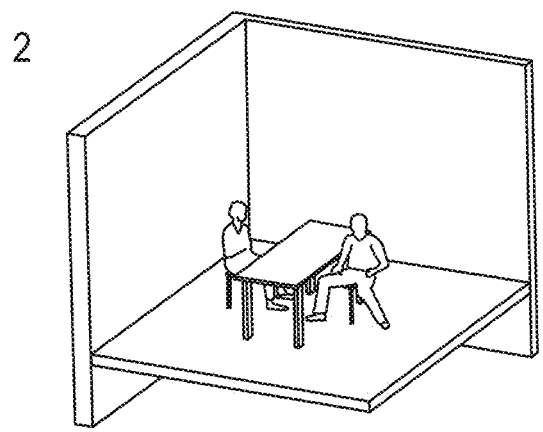
Figure 7B:
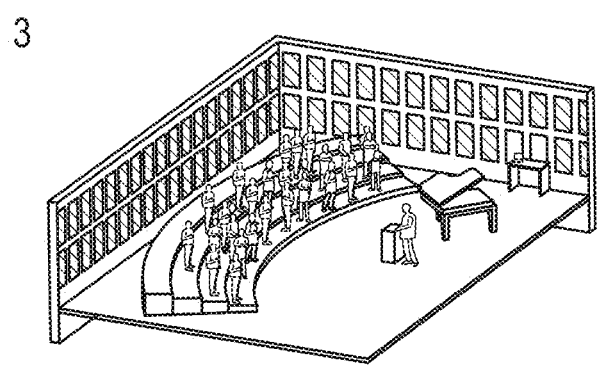

FIG. 7B illustrates a music classroom application. A choir teacher at a local high school is concerned about the sound intensity in the choir room. Not only do the hard surfaces of the walls and floor create undesirable reverberation, but the volume itself is generally unpleasant. The teacher has noticed that the instrument in the choir room often warns that the noise levels are above OSHA recommendations for the space. They decide to advocate for acoustic paneling on the walls of the space. Using the hard data from the instrument, they are able to make a much more compelling case for the improvement in a meeting with management. While the choir teacher did not need the instrument to perceive that the sound quality of the space required adjustment, the data it provided enhanced their ability to advocate on behalf of their environment. Hard data provided by sensors can make a convincing case for financial investment in the environment, particularly when linked to health, safety and welfare.

Figure 7C:
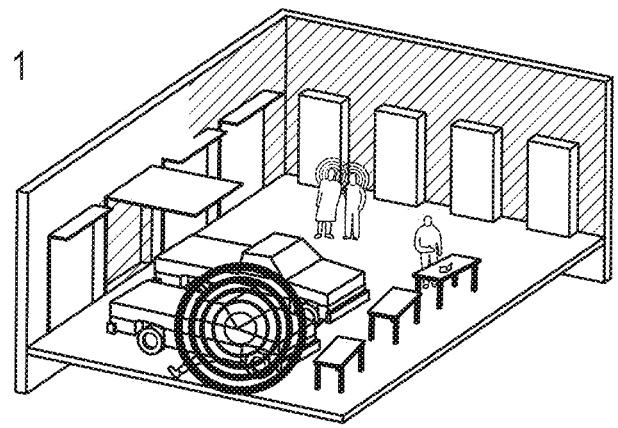
Figure 7C:
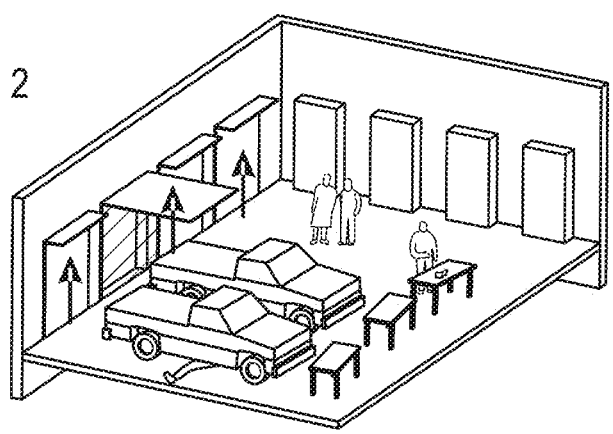
Figure 7C:
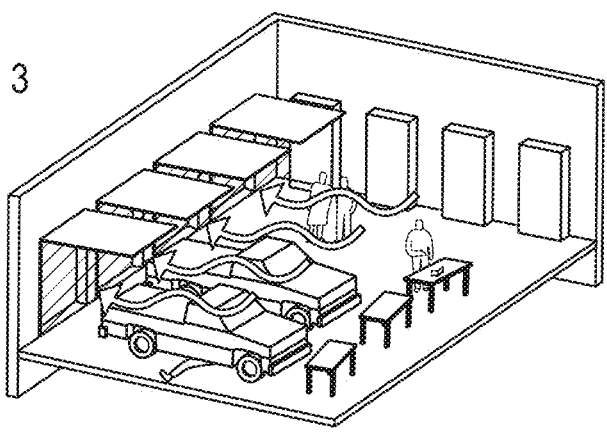

FIG. 7C illustrates an auto shop application. A mechanic believes he should probably put on ear protection as a particularly loud maintenance activity is taking place nearby in an auto shop. He decides to check the instrument to determine what the actual sound levels are. The instrument confirms his assumptions about the sound, and also indicates a level of CO high enough to impact occupant decision making, yet still safe for occupation. The mechanic warns the others in the space about the necessity to wear sound protection, as well as the elevated level of CO. The occupants decide to open all the garage doors and allow the space to air out. The decision to open to the garage doors has the additional affect of bringing in natural light, benefiting the light levels in a space where small fine motor tasks are performed. This example demonstrates how the instrument can be used to actively adjust characteristics which directly impact health, safety and welfare. This device can be used to provide rapid and multi-layered information for those whose well-being is directly impacted by their environment.

Figure 7D:
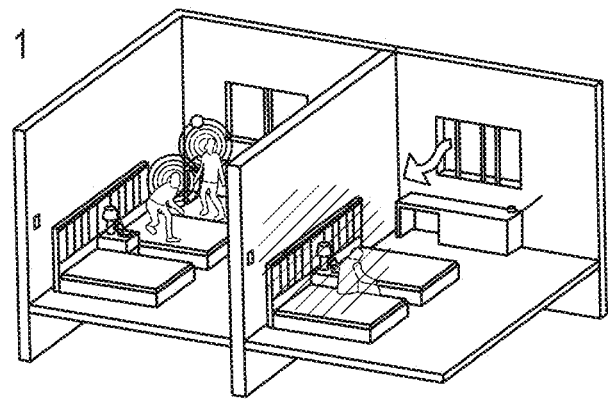
Figure 7D:
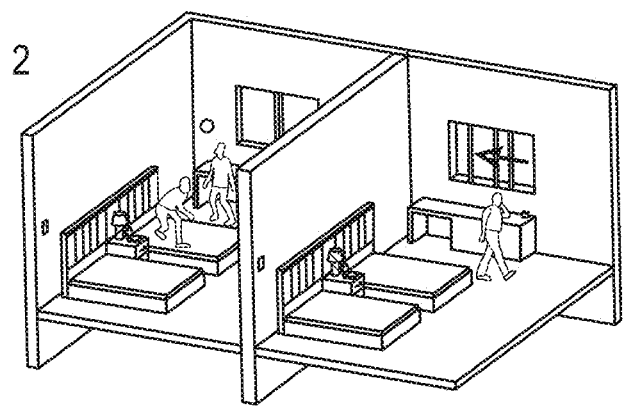
Figure 7D:
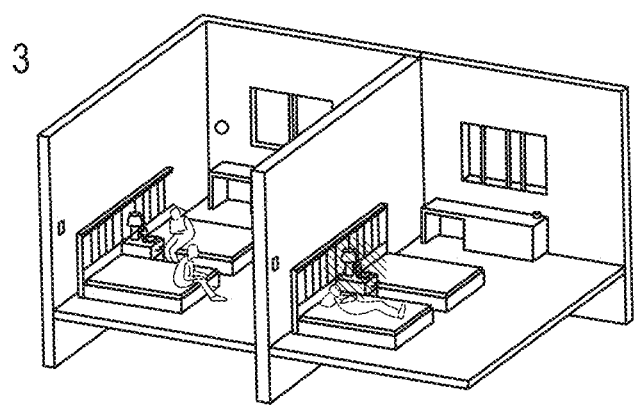

FIG. 7D illustrates a hotel unit application. A business traveler staying at a hotel is becoming annoyed at the noise coming from a neighboring room. They notice the instrument is displaying a message saying "After 10 pm quiet hours are in effect, if your neighbors are creating more than 60 dB of noise, contact the front desk." This encourages the traveler to call the front desk. While checking the room fitness instrument they also notice that the historical data shows the room's CO2 levels have progressively increased since they arrived, and a message encouraging them to adjust the room's LED chromatic bulbs to a warmer temperature to help them sleep. As the business traveler calls the front desk to complain about their neighbors, they also get up and switch the light color temperature. They suspect the CO2 levels might be caused by the window they opened which overlooks a highway. They close the window, and hotel management promises to address the noise issue. The business traveler can watch the instrument in real time as the light temperature changes from blue to yellow, the CO2 levels decrease and the neighbors quiet down. With this reassurance, they can rest easy. This example illustrates how a client organization can have custom messages built from the metrics. In this case, the hotel wants to reassure their guests that it is socially acceptable to call the front desk if their neighbors are being annoying late at night. Additionally, the hotel can use this instrument as a tool for communicating their push for wellness, promoting systems such as the lights with adjustable color temperature.

Example Computer System

The data processing capabilities described herein with respect to FIGS. 3, 4, 5 and elsewhere, may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 8:
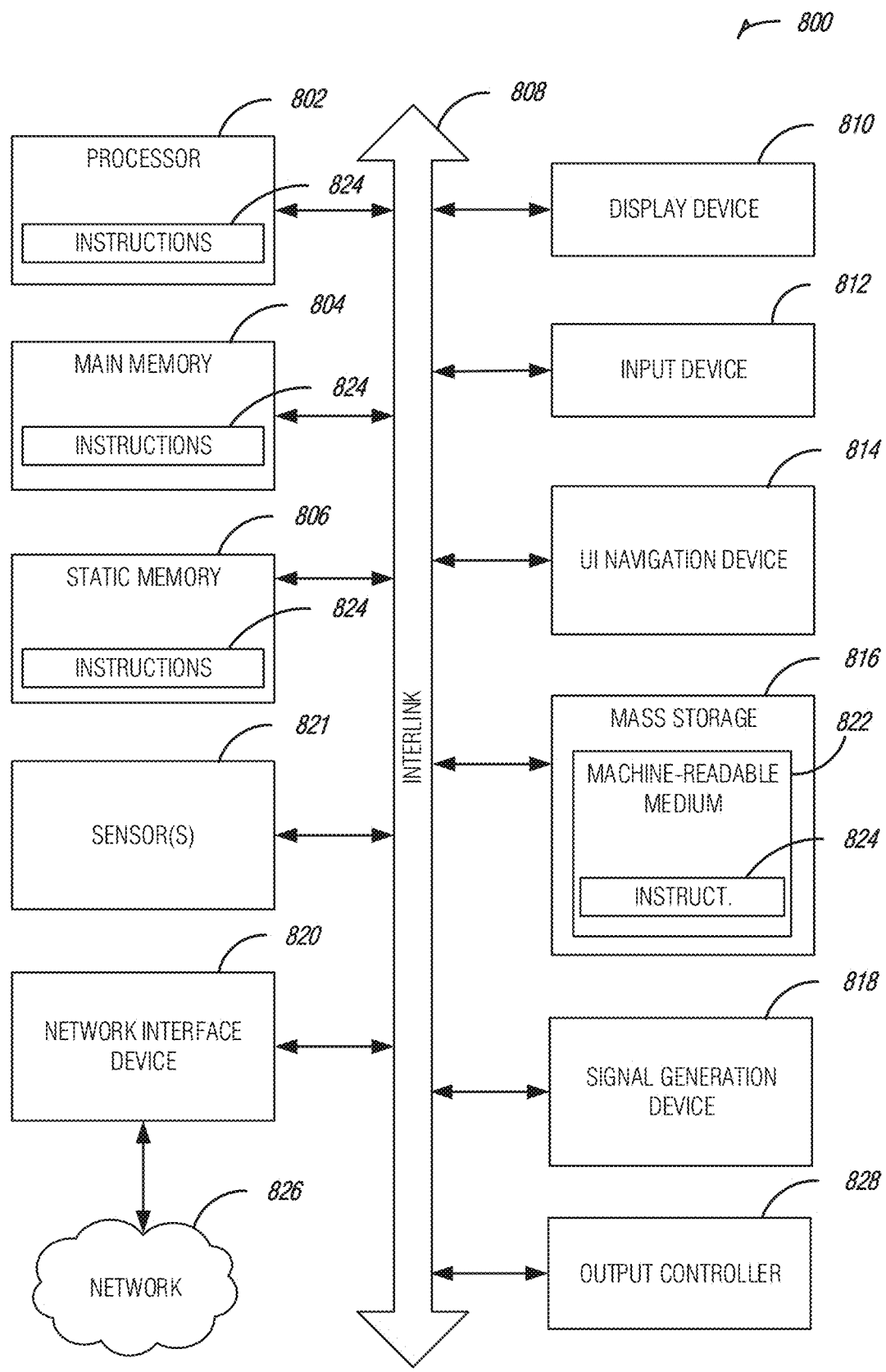
FIG. 8 illustrates an example computing system used in a room fitness instrument according to an example embodiment.

FIG. 8 illustrates a block diagram of an example machine 800 upon which any one or more of the techniques (e.g., methodologies) discussed herein may perform. For instance, the microcontroller 410 may be implemented as shown and described with respect to FIG. 8. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensors. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database or electronic data repository, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples may include solid-state memories, and optical and magnetic media. In an example, machine readable media may exclude transitory propagating signals (e.g., non-transitory machine-readable storage media). Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Thus, as illustrated above, the example embodiments of a room fitness instrument as described herein have the potential to inform building occupants' experiences of the built environment. The information this device can provide has the potential to add a new level of depth and sophistication to people's experiences of their places of work, learning and relaxation. By adding a layer of data to the immediately tangible characteristics of space, occupants can make more informed decisions about tuning their environment, advocate for permanent changes to this environment, make informed safety and health decisions and receive facility-specific direction based on the characteristics of the space.

What is claimed is:

1. A room wellness instrument for a room, comprising:
a sensor array including a plurality of sensors to obtain a plurality of room wellness measurements of the room environment that can have an impact on psychological or physiological wellness of human occupants, including:
(a) one or more measurements of thermal properties in the room;
(b) one or more measurements of air quality in the room;
(c) one or more measurements of illuminance in the room;
(d) one or more measurements of sound in the room;
a processor to receive the room wellness measurements and output a display control signal;
an electronic data repository including a prompt file, the prompt file including a prompt and an environmental condition or conditions to trigger display of the prompt;
a display receiving the display control signal and displaying a graphical image of room wellness information, the graphical image including:
(a) numerical data representing a current measurement obtained by the sensors in the
sensor array;
(b) a histogram display including substantially continuously updated histograms corresponding to each of the room wellness measurements obtained by the sensor array, the histograms being displayed simultaneously using a time scale that is the same for all histograms to allow an occupant of the room to correlate historical measurements in the room over time, the histogram including a substantially real-time measurement followed by historical measurements, the histograms further displayed on a scale that includes concentric circles, and wherein the histograms rotate around a center point;
(c) further wherein each of the histograms is color-coded and displays a magnitude of
each room wellness measurement on a scale that substantially spans an expected normal range of excursion for a respective magnitude,
(d) human readable information that informs a room occupant of how measurements may affect human health or productivity, wherein the human readable information is selected from the prompt file, and
wherein the room wellness instrument provides at least two modalities of information interpretation and enables a room occupant to correlate their qualitative experience in the room to objective measurements of the room's wellness, observe changes in the room wellness over time as measured by the sensor array, and optionally take action to in response to the information.

2. A room wellness instrument according to claim 1 further including computer readable instructions executed by the processor in order to determine if the prompt is to be displayed based on current and/or past environmental conditions in a room.

3. A room wellness instrument according to claim 1 further wherein the prompts include human readable messages indicating an impact on an occupant of a room, wherein the prompt displayed indicates a message to an occupant and is selected from a group of messages including: a message indicating a sound intensity level of the room may adversely affect hearing, a message indicating the room is experiencing elevated levels of VOCs and recommendation to consider taking action, a message indication the room is experiencing elevated levels of carbon dioxide that may cause headaches, poor concentration, or nausea, a message indicating that a blue light level in the room exceed recommended exposure levels prior to sleep and recommend changing light source exposure prior to planned bedtime, a message indicating that a light intensity in the room is suitable for reading books and most activities requiring visual focus, a message indicating that a light intensity in the room is low and not suitable for reading without potential eye strain, and a message that the room is experiencing high humidity levels which may cause discomfort, and a message indicating that the room is experiencing excessively high humidity levels that may promote mold propagation.

4. A room wellness instrument according to claim 1 wherein the sensor array includes:
a temperature sensor to sense ambient temperature and output an electronic temperature signal representative of the ambient temperature;
a humidity sensor to sense relative humidity and output an electronic relative humidity signal representative of humidity;
a carbon dioxide sensor to sense a carbon dioxide ($CO_2$) level in the air and output an electronic $CO_2$ signal representative of a $CO_2$ level in the air;
an illuminance sensor to sense illuminance and color temperature of illumination and output an electronic illuminance signal representative of level of illuminance and color temperature of the illumination;
a volatile organic compound (tVOC) sensor to detect the level of an organic compound in air and output an electronic tVOC signal representative of a detected organic compound; and
a decibel level sensor to detect a sound level and output an electronic decibel level signal.

5. A room wellness instrument according to claim 1 further wherein the electronic data repository includes one or more digital data files containing data specifying a correlation between a magnitude of a scientific measurement of an environmental condition and human wellness including a range of magnitudes that are favorable to human wellness, a range of magnitudes that are not favorable to human wellness, and human readable indicia concerning an influence of a scientific measurement on human wellness to be displayed in connection with a particular magnitude or range of magnitudes of a scientific measurement.

6. A room wellness instrument according to claim 1 further wherein the wellness instrument is supported in a housing of a mobile telephone, and the graphical display comprises the display of the mobile telephone.

7. A room wellness instrument according to claim 1 further wherein the histogram for a displayed measurement includes a baseline and further wherein excursions of a displayed measurement on one side of the baseline are positive excursions of a measurement, and excursions of a displayed measurement on an opposite side of the baseline are negative excursions of a measurement.

8. A room wellness instrument according to claim 1 further wherein each measurement displayed includes a human readable message respecting an environmental condition ascertained by the measurement.

9. A room wellness instrument according to claim 8 further including displaying a human readable message selected from one of the messages displayed for environmental conditions.

10. A method to measure and display room wellness parameters, comprising:
using a sensor array to obtain a plurality of room wellness measurements of the room environment that can have an impact on psychological or physiological wellness of human occupants, including:
(a) one or more measurements of thermal properties in the room;
(b) one or more measurements of air quality in the room;
(c) one or more measurements of illuminance in the room;
(d) one or more measurements of sound in the room;
receiving and processing room wellness measurements in a processor, and outputting a display control signal;
storing a prompt file in an electronic data repository, the prompt file including a prompt and an environmental condition or conditions to trigger display of the prompt;
using the display control signal to display a graphical image of room wellness information on a graphical display, the graphical image including:
(d) numerical data representing a current measurement obtained by each of the
sensors in the array;
(e) a histogram display including substantially continuously updated histograms corresponding to each of the room wellness measurements obtained by the sensor array, the histograms being displayed simultaneously using a time scale that is the same for all histograms to allow an occupant of the room to correlate historical measurements in the room over time, the histogram including a substantially real-time measurement followed by historical measurements, the histograms further displayed on a scale that includes concentric circles, and wherein the histograms rotate around a center point;
(f) further wherein each of the histograms is color-coded and displays a magnitude of
each room wellness measurement on a scale that substantially spans an expected normal range of excursion for a respective magnitude;
(d) human readable information that informs a room occupant of how measurements may affect human health or productivity, wherein the human readable information is selected from the prompt file; and
wherein the room wellness information provides at least two modalities of information interpretation and enables a room occupant to correlate their qualitative experience in the room to objective measurements of the room's wellness, observe changes in the room wellness over time as measured by the sensor array, and optionally take action to in response to the information.

11. A method according to claim 10 further including executing computer readable instructions using the processor in order to determine if the prompt is to be displayed based on current and/or past environmental conditions in a room.

12. A method according to claim 10 further wherein the prompts include human readable messages indicating an impact on an occupant of a room, wherein the prompt displayed to the user indicates a message to an occupant and is selected from a group of messages including: a message indicating the sound intensity level of the room may adversely affect hearing, a message indicating the room is experiencing elevated levels of VOCs and recommendation to consider taking action, a message indication the room is experiencing elevated levels of carbon dioxide that may cause headaches, poor concentration, or nausea, a message indicating that a blue light level in the room exceed recommended exposure levels prior to sleep and recommend changing light source exposure prior to planned bedtime, a message indicating that the light intensity in the room is suitable for reading books and most activities requiring visual focus, a message indicating that the light intensity in the room is low and not suitable for reading without potential eye strain, and a message that the room is experiencing high humidity levels which may cause discomfort, and a message indicating that the room is experiencing excessively high humidity levels that may promote mold propagation.

13. A method according to claim 12 further including displaying a human readable message selected from one of the messages displayed for environmental conditions.

14. A method according to claim 10 wherein the sensor array includes:
a temperature sensor to sense ambient temperature and output an electronic temperature signal representative of the ambient temperature;
a humidity sensor to sense relative humidity and output an electronic relative humidity signal representative of humidity;
a carbon dioxide sensor to sense a carbon dioxide ($CO_2$) level in the air and output an electronic $CO_2$ signal representative of a $CO_2$ level in the air;
an illuminance sensor to sense illuminance and color temperature of illumination and output an electronic illuminance signal representative of level of illuminance and color temperature of the illumination;
a volatile organic compound (tVOC) sensor to detect the level of an organic compound in air and output an electronic tVOC signal representative of a detected organic compound; and
a decibel level sensor to detect a sound level and output an electronic decibel level signal.

15. A method according to claim 10 further comprising an electronic data repository including one or more digital data files containing data specifying a correlation between a magnitude of a scientific measurement of an environmental condition and human wellness including a range of magnitudes that are favorable to human wellness, a range of magnitudes that are not favorable to human wellness, and human readable indicia concerning an influence of a scientific measurement on human wellness to be displayed in connection with a particular magnitude or range of magnitudes of a scientific measurement.

16. A method according to claim 15 further wherein the graphical display comprises the display of the mobile telephone.

17. A method according to claim 10 further wherein the histogram for a displayed measurement includes a baseline and further wherein excursions of a displayed measurement on one side of the baseline are positive excursions of a measurement, and excursions of a displayed measurement on an opposite side of the baseline are negative excursions of a measurement.

18. A method according to claim 10 further wherein each measurement displayed includes a human readable message respecting an environmental condition ascertained by the measurement.

* * * * *

UNITED STATES PATENT AND TRADEMARK OFFICE
CERTIFICATE OF CORRECTION

PATENT NO. : 10,572,956 B1
APPLICATION NO. : 16/460034
DATED : February 25, 2020
INVENTOR(S) : Wilbrecht et al.

Page 1 of 2

It is certified that error appears in the above-identified patent and that said Letters Patent is hereby corrected as shown below:

In the Claims

In Column 15, Line 49, in Claim 1, after "the", delete "¶"

In Column 15, Line 64, in Claim 1, after "of", delete "¶"

In Column 15, Line 67, in Claim 1, delete "magnitude," and insert --magnitude;-- therefor In Column 16, Line 4, in Claim 1, delete "file," and insert --file;-- therefor In Column 16, Line 47, in Claim 4, delete "(CO2)" and insert --($CO_2$)-- therefor In Column 16, Line 48, in Claim 4, delete "CO2" and insert --$CO_2$-- therefor In Column 16, Line 49, in Claim 4, delete "CO2" and insert --$CO_2$-- therefor In Column 17, Line 42, in Claim 10, delete "(d)" and insert --(a)-- therefor In Column 17, Line 43, in Claim 10, after "the", delete "¶"

In Column 17, Line 45, in Claim 10, delete "(e)" and insert --(b)-- therefor

In Column 17, Line 57, in Claim 10, delete "(f)" and insert --(c)-- therefor

In Column 17, Line 58, in Claim 10, after "of", delete "¶"

In Column 18, Line 46, in Claim 14, delete "(CO2)" and insert --($CO_2$)-- therefor Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*

In Column 18, Line 47, in Claim 14, delete "CO2" and insert --$CO_2$-- therefor

In Column 18, Line 48, in Claim 14, delete "CO2" and insert --$CO_2$-- therefor